United States Patent [19]
Crispie et al.

[11] Patent Number: 5,798,692
[45] Date of Patent: Aug. 25, 1998

[54] DIGITAL COMPENSATION CIRCUIT FOR CALIBRATION OF SENSORS

[75] Inventors: Finbarr J. Crispie, Mountain View; Bertram J. Rodgers, III, San Francisco; Sofjan Goenawan, Milpitas, all of Calif.

[73] Assignee: Integrated Sensor Solutions, San Jose, Calif.

[21] Appl. No.: 625,560

[22] Filed: Apr. 1, 1996

[51] Int. Cl.$^6$ .................................. G08B 23/00
[52] U.S. Cl. ................ 340/501; 340/506; 340/511
[58] Field of Search .................. 340/501, 506, 340/146.2, 511; 341/120, 121, 143, 155

[56] References Cited

U.S. PATENT DOCUMENTS 4,272,760  6/1981  Prazak et al. .................. 341/120
5,319,370  6/1994  Signore et al. ................. 341/120

Primary Examiner—Thomas J. Mullen, Jr.
Assistant Examiner—Daryl C. Pope
Attorney, Agent, or Firm—Sawyer & Associates

[57] ABSTRACT

A digital compensation circuit for calibrating a sensor includes a serial communication circuit for receiving data relating to a plurality of parameters and a plurality of registers coupled to the serial communication circuit; one of plurality of registers for reading temperature information. The digital compensation circuit further includes a digital trim circuit for adjusting the temperature information in the one of plurality of registers to a predetermined value at an initial calibration temperature. Finally, the digital compensation circuit further includes means responsive to the digital trim circuit for measuring gain and offset at a predetermined value of the physical parameter being measured.

9 Claims, 5 Drawing Sheets

DIGITAL COMPENSATION CIRCUIT FOR CALIBRATION OF SENSORS

FIELD OF THE INVENTION

The present invention relates generally to sensors and more particularly for removing the interdependence of compensation parameters for such sensors.

BACKGROUND OF THE INVENTION

Piezoresistive and capacitive sensors are being used in increasingly higher accuracy applications for sensing various changes in pressure and the like in a variety of environments. Because the output of these sensors typically varies over temperature, they require compensation and calibration in order to achieve the accuracy and temperature stability requirements of these applications. The calibration of sensors typically requires the adjustment of four parameters to achieve optimum output performance over temperature—offset, offset temperature coefficient (OTC), signal gain, and gain temperature coefficient (GTC).

In general the transfer function of a sensor is given by:

$$Vsens = Offset_0 \cdot (1+\alpha \cdot T) + S_0 \cdot (1+\beta \cdot T) \cdot Q \quad \text{Equation 1}$$

where:

Vsens is the sensor output voltage $Offset_0$ is the sensor offset (output with zero excitation) at a reference temperature (e.g. 25° C.)

$\alpha$ is the temperature coefficient of the sensor offset

T is the temperature difference from the reference temperature $S_0$ is the sensor sensitivity at the reference temperature (e.g. 25° C.)

$\beta$ is the temperature coefficient of the sensor sensitivity

Q is the physical parameter being sensed (e.g. pressure, acceleration, etc.)

To compensate this output signal, a signal conditioning circuit is required which must subtract out the offset terms and provide amplification which varies with temperature to counteract the effect of the sensor sensitivity temperature coefficient [(TC)]. Traditionally, the signal conditioning has been done with opamps and laser trimmed resistors. However this method is expensive as it requires the use of a laser and the solution is typically not monolithic (on a single integrated circuit) as the opamps and resistors are usually built on separate substrates.

More recently, digital compensation techniques have been used as the calibration process is considerably less expensive than laser trimming and they offer the possibility of integrating the complete signal conditioning on a single integrated circuit. One prior art circuit for implementing digital compensation as shown in FIG. 1 uses two operational amplifiers 12 and 14, a voltage to current converter 16 and two current sources 18 and 20 to do the complete compensation. The temperature coefficient of the sensor sensitivity (STC) is compensated by amplifier 12, which produces a temperature variable bridge excitation voltage. The resulting STC-compensated differential bridge voltage is then converted to a signal current, connected to a summation point 24. Additionally, the two current sources 18 and 20 are coupled to the summation point 24. They provide constant current and a temperature dependent current for compensating the offset and the temperature coefficient of the offset (OTC) respectively. The output stage of amplifier 14 acts as a current to voltage converter, also amplifying the output voltage to the desired level. Each of the compensation parameters can be adjusted by switching binary weighted current portions controlled by thyristor arrays 26. Trimming of the compensation parameters is performed using an electrical trim method. Digital information is serially fed into an on-chip control unit 28. The individual bits are decoded and sent to the gates of a bank of trimming thyristors 26. Once the correct binary code has been selected to center the sensor characteristic in the specified range, the programming voltage is increased and the data are irreversibly stored as in the conventional zener diode zapping method.

The transfer function of the conventional digital compensation circuit 10 is given below:

$$Vout = (Vsens + Voff + Votc \cdot T) \cdot Gain_0 \quad \text{Equation 2}$$

where Vsens is now given by:

$$Vsens = [Offset_0 \cdot (1+\alpha \cdot T) + S_0 \cdot Q \cdot (1+\beta \cdot T)] \cdot (1+\delta \cdot T) \quad \text{Equation 3}$$

since the sensor is being driven by a temperature dependent voltage.

Vout is the calibrated sensor output voltage (output of conditioning circuit)

$Gain_0$ is gain of the compensating amplifier at the reference temperature

Voff is the offset added by the conditioning circuit

Votc·T is the temperature dependent component of the offset added by the conditioning circuit $\delta$ is the temperature coefficient of the bridge excitation voltage By combining equations 2 and 3 the following equation for the calibrated sensor output is obtained:

$$Vout = [S_0 \cdot Q \cdot (1+\beta \cdot T) \cdot (1+\delta \cdot T) + Offset_0 \cdot (1+\alpha \cdot T) \cdot (1+\delta \cdot T) + Voff + Votc \cdot T] \cdot Gain_0 \quad \text{Equation 4}$$

The calibration of the sensor 5 involves making measurements of Vout at various values of Q and various temperatures and thereby deducing the values of Voff, Votc, $Gain_0$ and $\delta$ to minimize the error between Vout and the ideal sensor characteristic. Ideally the Voff, and $Gain_0$ terms would be found first using measurements at the initial calibration temperature at minimum and maximum Q. The temperature dependent terms would then be found by an additional set of measurements at high (or low) temperature.

However Equation 4 has several terms which depend on T and all these terms must be zero at the initial calibration temperature if Voff and $Gain_0$ are to be found accurately. If not then the contribution of these terms will confound the calculation of Voff and $Gain_0$. That is, then when the high (or low) temperature calibration is done and Votc and $\delta$ are adjusted, the values for Voff and $Gain_0$ will have to change since the equilibrium of Equation 4 has changed. Several iterations between temperatures may be required to find all four parameters accurately.

It is possible to remove the interdependence of the parameters by adjusting the initial calibration temperature so that T is zero. This removes the temperature dependent parameters from Equation 4. However, depending on the processing variations this temperature may need to be adjusted differently for each sensor, depending on the accuracy requirements. Since a large portion of the calibration time is taken up adjusting temperature, having to iterate to find parameter values or having to adjust the initial calibration temperature for each sensor adds significant time to the calibration sequence. This is a major limitation for low cost manufacturing of these sensors.

A second embodiment of a digital compensation circuit 100 is shown in FIG. 2. In this embodiment, the differential signal from the sensor 5' is fed into an amplifier 102 which may have a gain of 1 or greater depending on the application. The output of this amplifier is fed into another amplifier stage 104 whose gain is controlled by the contents of a gain register 106. In addition the offset and offset TC terms are added at summation point 114 in this stage using DACs 108, 110, 112 controlled by digital parameters. The compensation of the sensor sensitivity TC is done in the third stage 116 after the offset, offset TC and gain compensation. The third stage 116 may also have a gain of 1 or greater depending on the application. The final stage is an output buffer 111.

In this circuit, the temperature, T, is sensed using an on-chip proportional to absolute temperature (PTAT) circuit 122. The analog signal representing T is digitized using an analog-to-digital converter 124. The digital word representing T is then used to control two DACs 110 and 120, one for the offset TC compensation and the other for the gain TC compensation. As with the circuit in FIG. 1, digital information is serially fed into an on-chip control unit. The individual bits are decoded and sent to the various DACs. Once the correct binary code has been selected to center the sensor characteristic in the specified range, the code is stored using a digital storage method such as zener-zap, EEPROM or fuse link.

The transfer function of this circuit is given by equation 5.

$$Vout = (Vsens + Voff + Votc \cdot T) \cdot Gain_0 \cdot (1 + \alpha \cdot T) \qquad \text{Equation 5}$$

Combining equations 1 and 5 gives:

$$Vout = [S_0 \cdot Q \cdot (1 + \beta \cdot T) + Offset_0 \cdot (1 + \alpha \cdot T) + Voff + Votc \cdot T] \cdot Gain_0 \cdot (1 + \delta \cdot T) \qquad \text{Equation 6}$$

Accordingly, this circuit 100 suffers from the same limitation as the circuit 10 in FIG. 1 regarding the interdependence of the compensation parameters. Accordingly, what is needed is a system and method for more simply calibrating sensors. More particularly, the system should be such that it is a simple and cost effective way to simplify the calibration process. Finally, the system should be one that removes the interdependence of compensation parameters. The present invention addresses such a need.

SUMMARY OF THE INVENTION

A digital compensation circuit for calibrating a sensor includes a serial communication circuit for receiving data relating to a plurality of parameters and a plurality of registers coupled to the serial communication circuit; one of plurality of registers for reading temperature information. The digital compensation circuit further includes a digital trim circuit for adjusting the temperature information in the one of plurality of registers to a predetermined value at an initial calibration. Finally, the digital compensation circuit further includes means responsive to the digital trim circuit for measuring a gain and offset at a predetermined value of the physical parameter being measured.

$Offset_0$ in a preferred embodiment can be found by the single measurement at minimum Q. $Gain_0$ in a preferred embodiment can be found by a single additional measurement at maximum Q. There are no temperature dependent terms to confound the calculation of $Offset_0$ and $Gain_0$. Therefore the need to adjust the temperature of the initial calibration to make these terms be zero has been eliminated. This is a significant advantage over the prior art as the time for calibration can be dramatically shortened. After finding the values of $Offset_0$ and $Gain_0$, the calibration can be completed with just one excursion to a different temperature (typically Tmax or Tmin) to find Votc and $\delta$.

A significant additional advantage of the present invention is that the initial temperature for calibration can vary over a wide range. In fact it can be any temperature within the trim range of the T parameter. This is useful for high accuracy applications where the sensor has a second order temperature characteristic. In such cases, because it may be desired to make the errors at high and low temperature equal, it is useful to be able to make the initial calibration midway between the high and low temperature. For example, for applications between −40° C. and 125° C. this might be as high as 42° C. With prior art this type of calibration would be very difficult since the temperature terms would be very significant at the initial calibration temperature. With the present invention, the value of T is made equal to zero and the calibration can be completed as easily as if the initial calibration were at room temperature.

DETAILED DESCRIPTION

The present invention relates to an improvement for a calibration system for a sensor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
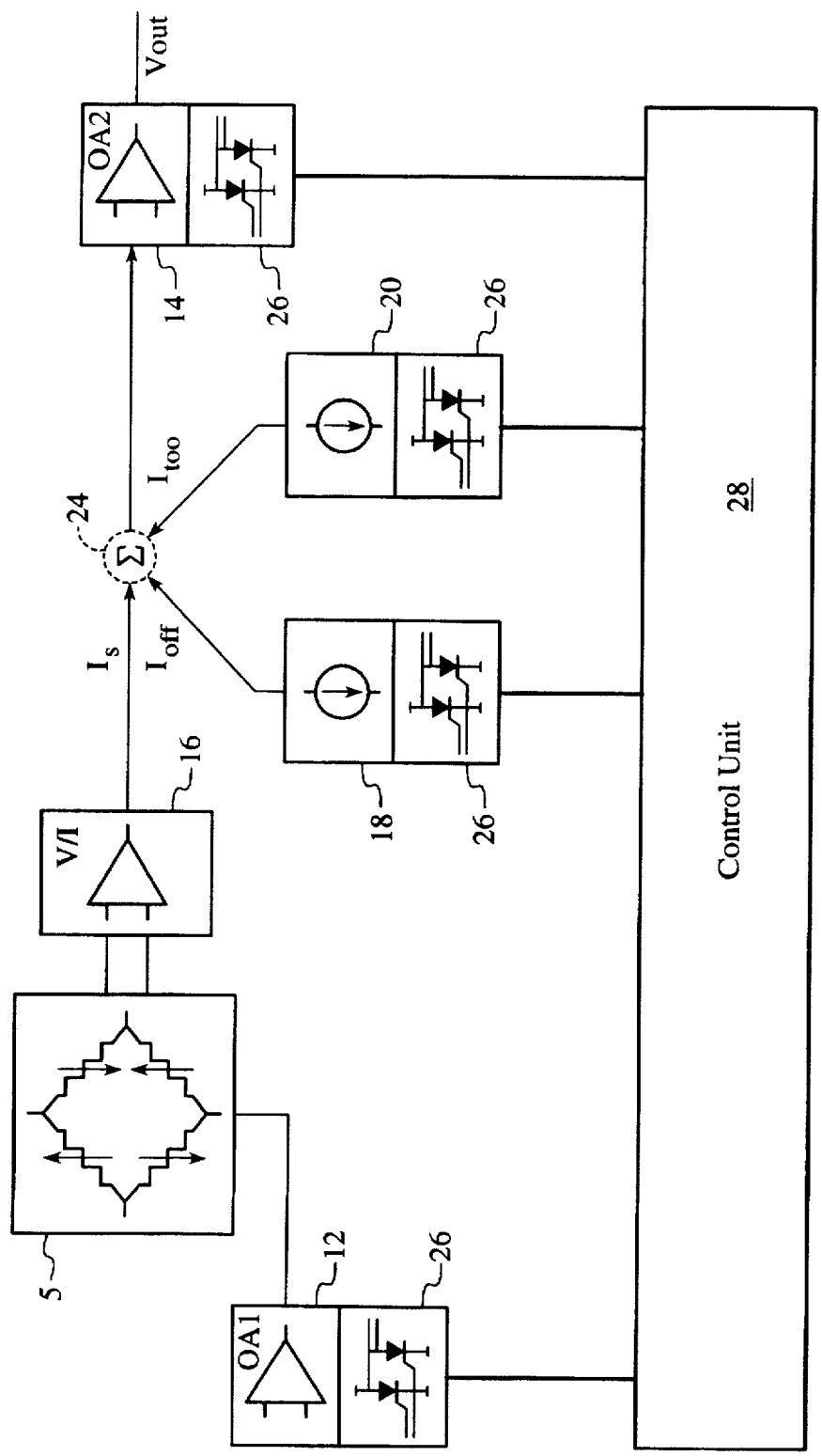
FIG. 1 is a block diagram of a first embodiment of a conventional calibration system for a sensor system.
Figure 2:
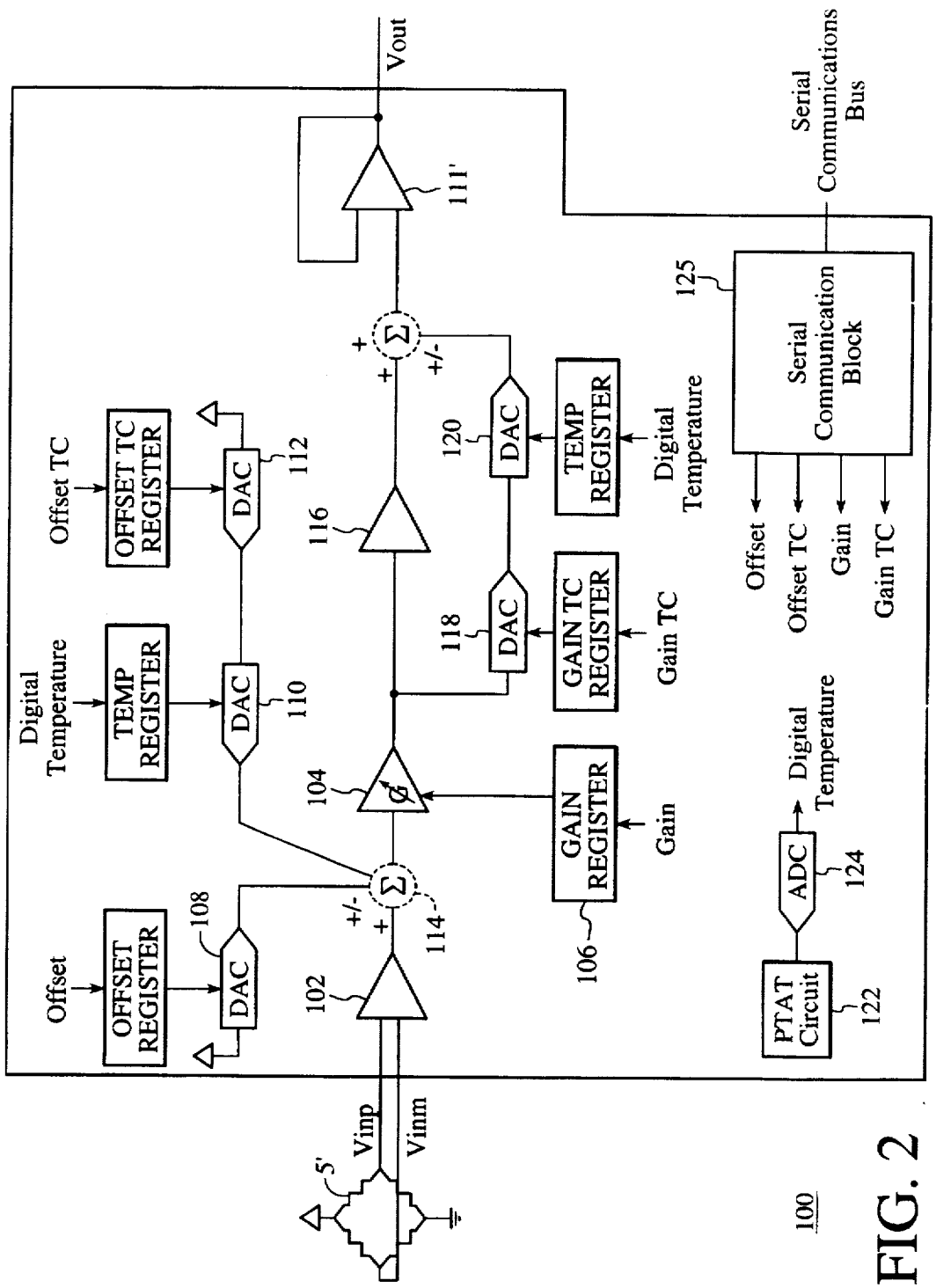
FIG. 2 is a second embodiment of a conventional calibration system for a sensor.
Figure 3:
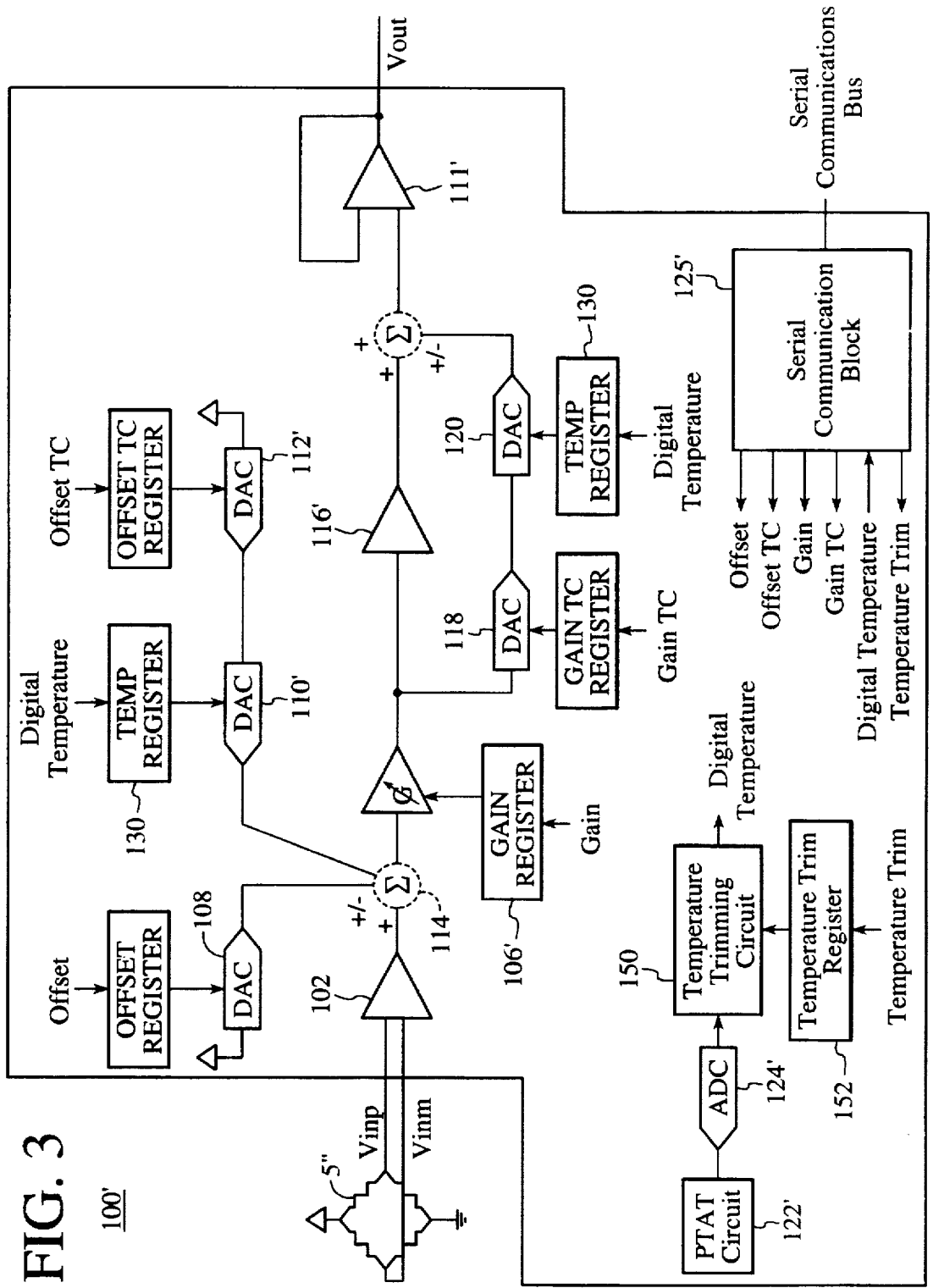
FIG. 3 is a digital compensation system for a sensor in accordance with the present invention.

In the present invention, the value of temperature can be adjusted during calibration so that the reference temperature can be made equal to the initial calibration temperature. Accordingly, this is done by providing a digital trim mechanism to change the contents of the temperature register. The value of T can be read out via a digital interface and the amount of the trim necessary to adjust it calculated. The trim coefficient can then be fed back into the serial communication block. To more particularly describe the operation of the present invention, refer now to FIG. 3. FIG. 3 has many of the same components as that shown in FIG. 2. However, a critical and important difference is the cooperation of the temperature trimming circuit 150 with the other components of the circuit. The temperature trim circuit 150 receives temperature trim information via serial communications block 125 and provides a digitally trimmed temperature to the temperature register in the SCC (signal conditioning circuit).

Figure 4:
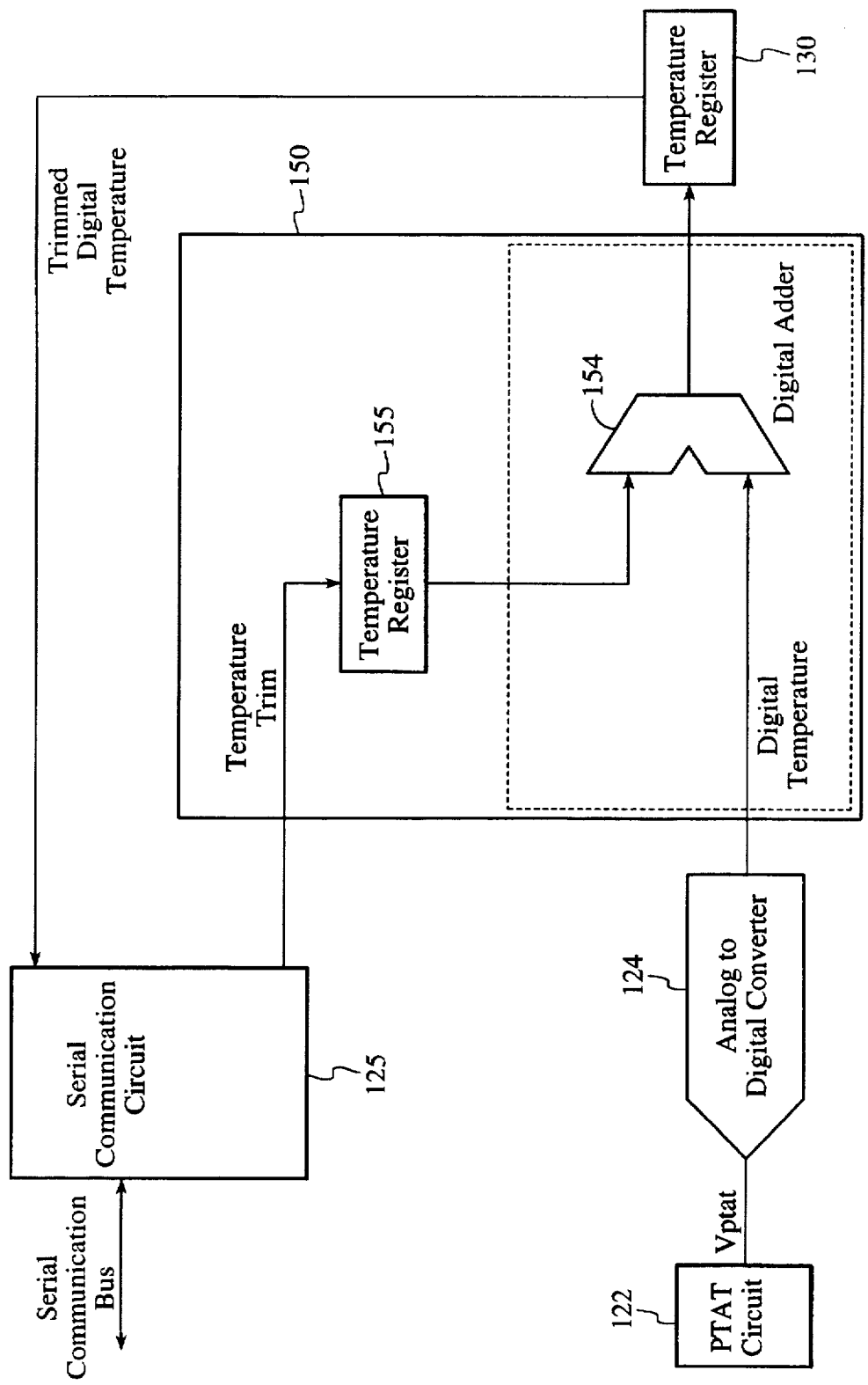
FIG. 4 is an expanded view of the temperature trim portion of the calibration system of FIG. 3.

Referring now to FIG. 4 which is an expanded view of the digital trim circuit 150, as is seen, the serial communications circuit provides a temperature trim data to its temperature trim register 155. The temperature trim data is then combined with the digital temperature from the A/D converter via an adder 154. The data from the adder 154 is provided to the temperature register 152. The register 152 provides the trimmed digital temperature to the SCC.

By adjusting the value of T to be zero at the initial calibration temperature, equation 6 becomes:

$$V_{out} = |S_0 \cdot Q + \text{Offset}_0 + V_{off}| \cdot \text{Gain}_0 \qquad \text{Equation 7}$$

Figure 5:
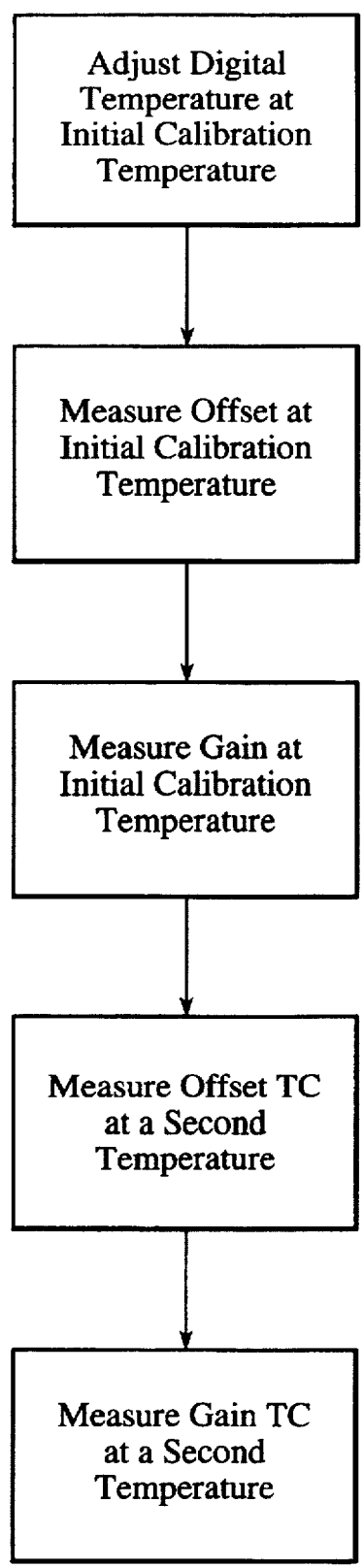
FIG. 5 is a flow chart of the operation of the digital compensation system in accordance with the present invention.

Accordingly, in a preferred embodiment, as is seen in FIG. 5 first the temperature is adjusted by the digital trim circuit via step 202. The offset is then measured at a minimum value of the physical parameter being measured via step 204. Thereafter, the gain is measured at a maximum value of the physical parameter being measured via step 206. Thereafter, the offset $T_c$ and the Gain $T_c$ is measured via steps 208 and 210. This measurement of the gain and offset can be accomplished manually, through a controller or the like or via software control. In addition, in the preferred embodiment, the digital trim circuit removes the temperature dependent terms of both the offset and sensitivity of the sensor at the initial calibration temperature. However, one of ordinary skill in the art will recognize that a particular sensor may have a temperature dependent sensitivity but may not have a temperature dependent offset or vice versa and it would be within the spirit and scope of the present invention to remove the temperature dependency of that one parameter at the initial calibration temperature.

$\text{Offset}_0$ in a preferred embodiment can be found by the single measurement at minimum Q. $\text{Gain}_0$ in a preferred embodiment can be found by a single additional measurement at maximum Q. There are no temperature dependent terms to confound the calculation of $\text{Offset}_0$ and $\text{Gain}_0$. Therefore the need to adjust the temperature of the initial calibration to make these terms be zero has been eliminated. This is a significant advantage over the prior art as the time for calibration can be dramatically shortened. After finding the values of $\text{Offset}_0$ and $\text{Gain}_0$, the calibration can be completed with just one excursion to a different temperature (typically Tmax or Tmin) to find Votc and $\delta$.

A significant additional advantage of the present invention is that the initial temperature for calibration can vary over a wide range. In fact it can be any temperature within the trim range of the T parameter. This is useful for high accuracy applications where the sensor has a second order temperature characteristic. In such cases, because it may be desired to make the errors at high and low temperature equal, it is useful to be able to make the initial calibration midway between the high and low temperature. For example, for applications between −40° C. and 125° C. this might be as high as 42° C. With prior art this type of calibration would be very difficult since the temperature terms would be very significant at the initial calibration temperature. With the present invention invention, the value of T is made equal to zero and the calibration can be completed as easily as if the initial calibration were at room temperature.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A digital compensation circuit for calibrating a sensor comprising:

a serial communication circuit for receiving data relating to a plurality of parameters;

a plurality of registers coupled to the serial communication circuit, one of the plurality of registers for reading temperature information;

a digital trim circuit for adjusting the temperature information in the one of the plurality of registers to a first predetermined value at an initial calibration temperature;

means responsive to the digital trim circuit for measuring gain and offset of a physical parameter being measured, the measuring means further including;

means responsive to the digital trim circuit for measuring an offset at a minimum value of the physical parameter being measured; and means responsive to the digital trim circuit for measuring a gain at a maximum value of the physical parameter being measured; and means for determining a temperature coefficient of a sensor sensitivity.

2. The circuit of claim 1 in which the measuring means further comprise:

means responsive to the digital trim circuit for measuring an offset at a second predetermined value of the physical parameter being measured; and means responsive to the digital trim circuit for measuring a gain at a third predetermined value of the physical parameter being measured.

3. The circuit of claim 1 in which the first predetermined value is zero.

4. The circuit of claim 2 in which the second predetermined value is a minimum value.

5. The circuit of claim 4 in which the third predetermined value is a maximum value.

6. A digital compensation circuit for calibrating a sensor comprising:

a serial communication circuit for receiving data relating to a plurality of parameters;

a plurality of registers coupled to the serial communication circuit, one of the plurality of registers for reading temperature information;

a digital trim circuit for adjusting the temperature information in the one of the plurality of registers to a zero value at an initial calibration temperature;

means responsive to the digital trim circuit for measuring gain and offset of a physical parameter being measured; and means for determining the temperature coefficient of the sensor offset.

7. A method for calibrating a bridge sensor comprising the steps of:

(a) receiving data relating to a plurality of parameters;

(b) receiving temperature information;

(c) adjusting the temperature information to a first predetermined value at an initial calibration temperature;

(d) measuring a gain and offset of a physical parameter being measured by the sensor, the measuring step further comprising the steps of:

(d1) measuring the offset at a zero value of the physical parameter being measured, and (d2) measuring the gain at a maximum value of the physical parameter being measured;

(e) determining the temperature coefficient of the sensor.

8. The method of claim 7 which further includes;

(f) determining a temperature coefficient of a sensor offset.

9. The method of claim 7 in which the zero value is a minimum value.

* * * * *